United States Patent [19]

Welcker

[11] 4,035,970

[45] July 19, 1977

[54] PREFABRICATED MODULAR HELICAL ESCAPE STRUCTURE FOR MULTIPLE STORY BUILDINGS

[75] Inventor: Willy H. Welcker, South San Francisco, Calif.

[73] Assignee: Rudi Van Byelvelt, Pinole, Calif.

[21] Appl. No.: 665,950

[22] Filed: Mar. 11, 1976

[51] Int. Cl.[2] .................... E04F 11/14; E04H 14/00; B65G 11/06

[52] U.S. Cl. .................... 52/187; 52/176; 182/48; 193/12

[58] Field of Search .................... 52/185–187, 52/33, 175, 176; 182/48, 49; 193/8, 12

[56] References Cited

U.S. PATENT DOCUMENTS

| | | | |
|---|---|---|---|
| 277,156 | 5/1883 | Pardessus | 52/187 |
| 506,238 | 10/1893 | Kirker | 52/187 |
| 518,659 | 4/1894 | Bender | 193/12 |
| 759,922 | 5/1904 | Schwab | 193/12 |
| 764,012 | 7/1904 | Schwab | 193/12 |
| 833,249 | 10/1906 | Schwab | 193/12 |
| 1,173,074 | 2/1916 | Williams | 52/186 |
| 3,768,016 | 10/1973 | Townsend | 182/49 |

*Primary Examiner*—Price C. Faw, Jr.
*Assistant Examiner*—James L. Ridgill, Jr.
*Attorney, Agent, or Firm*—Fulwider, Patton, Rieber, Lee & Utecht

[57] ABSTRACT

A double helical earthquake and fire escape structure for multiple story buildings formed mainly of a plurality of prefabricated section of precast concrete. Two identically formed upper sectional units and two identically formed lower units are arranged in facing relationship to each other for each floor of the building. Complementary portions of the assembled units combine to form a pair of oppositely disposed entrances on each floor leading to two separate helical slides arranged about a separately formed central circular smokestack. The units are provided with steel members adjacent their edges which are connected together and secured to a surrounding supporting steel framework. Two additional smokestacks formed within the corners of the assembled units may also be used as shoe drops.

7 Claims, 13 Drawing Figures

FIG. 1
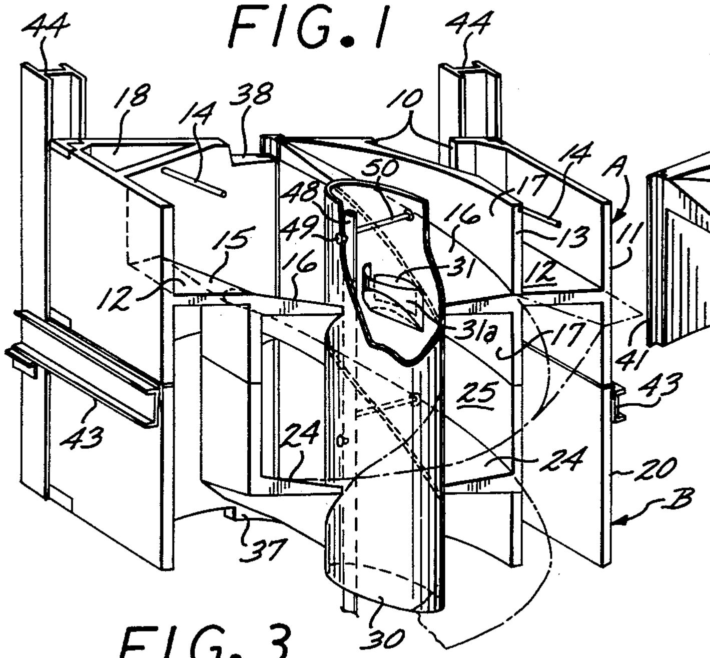
FIG. 2
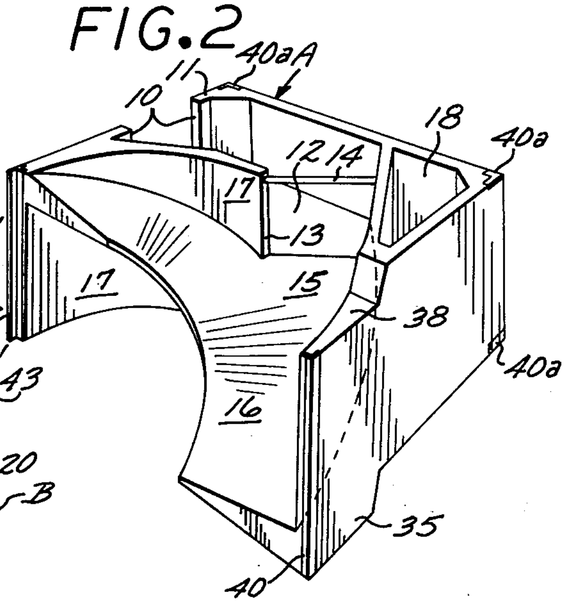
FIG. 3
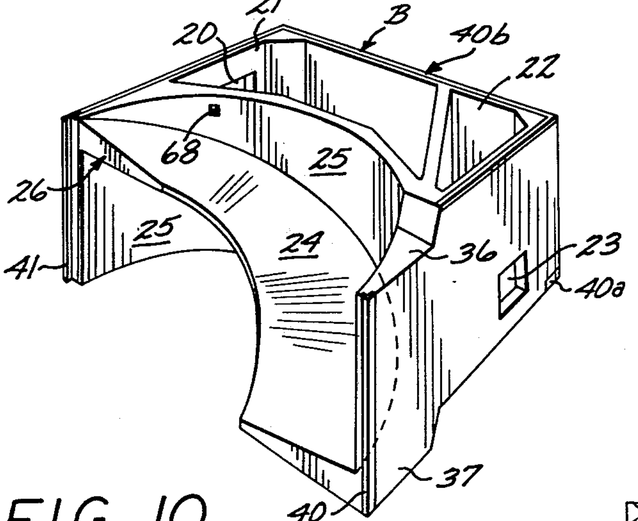
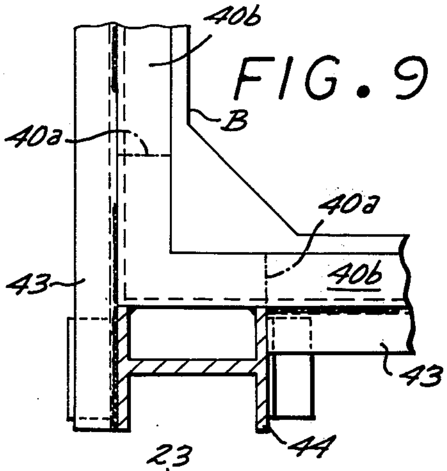
FIG. 9
FIG. 10
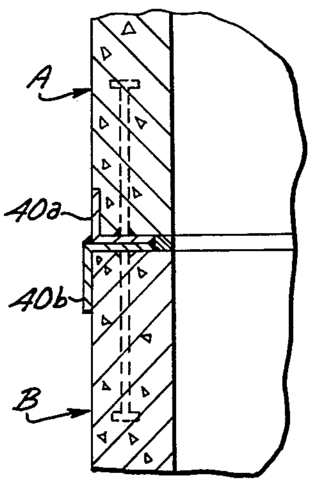
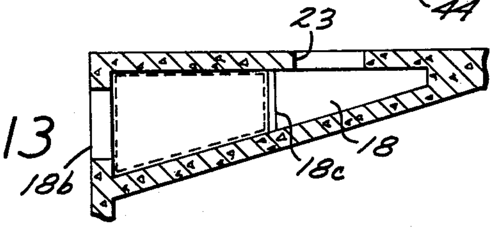
FIG. 13
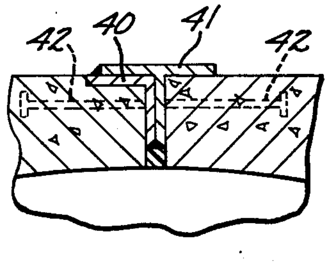
FIG. 11
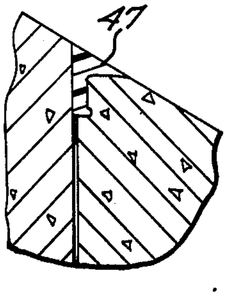
FIG. 12

FIG.4
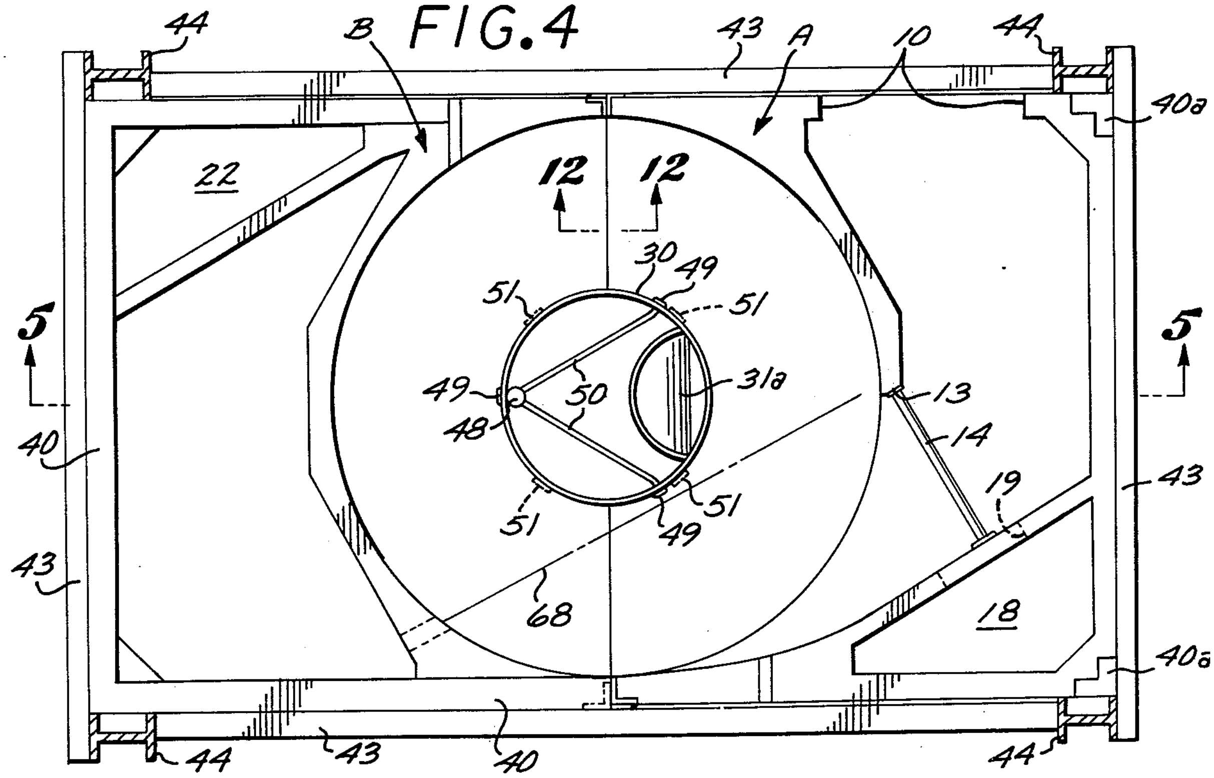
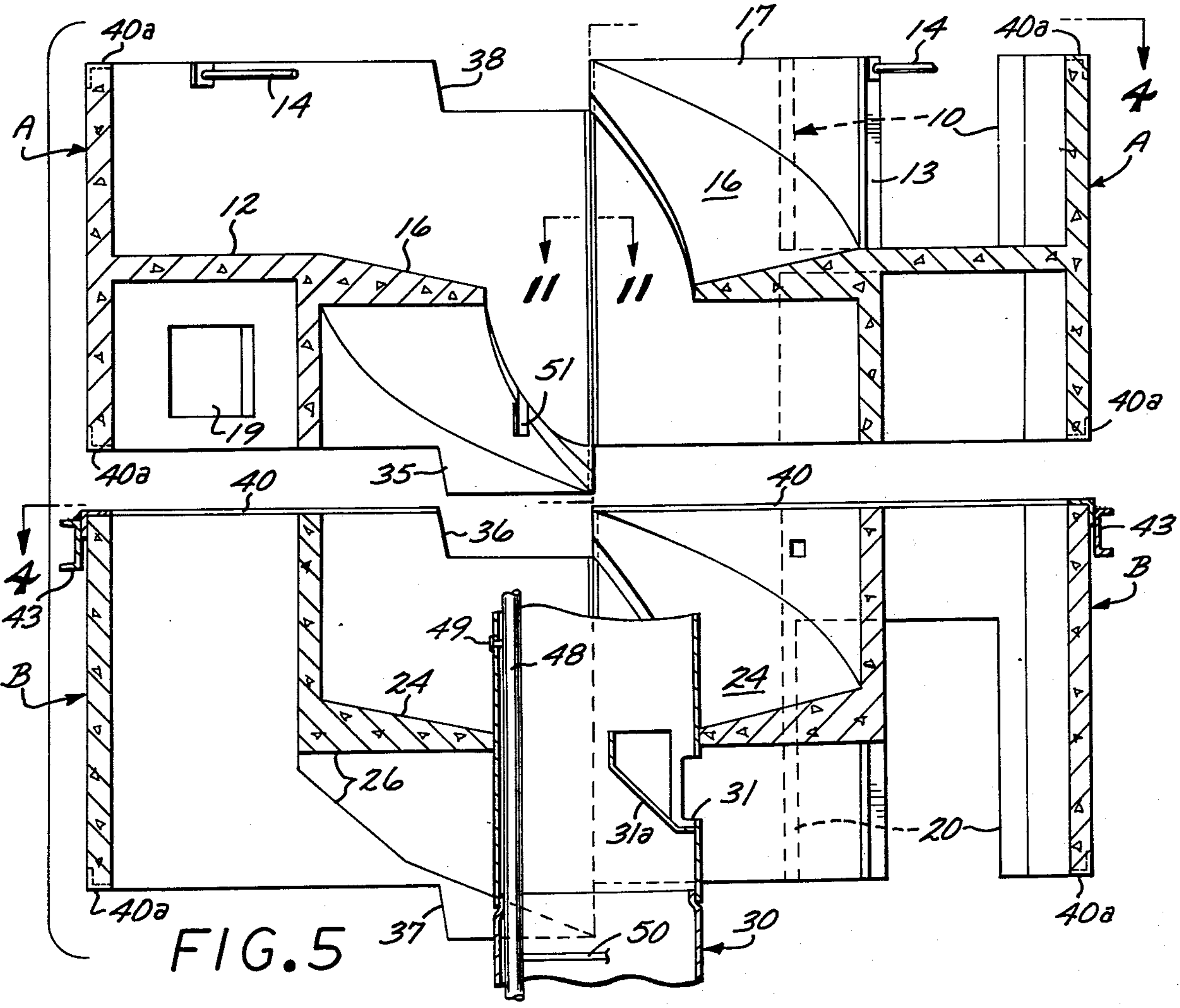
FIG.5

PREFABRICATED MODULAR HELICAL ESCAPE STRUCTURE FOR MULTIPLE STORY BUILDINGS

BACKGROUND OF THE INVENTION

1. Field of the Invention

The invention relates to a prefabricated modular helical earthquake and fire escape structure for attachment to or incorporation in a multiple story building.

2. Description of the Prior Art

High rise buildings at the present time utilize conventional stairwells for evacuating occupants of the building in the event of an earthquake or fire. It has been found that fires often spread from one floor to another through these stairwells, which are usually the only route to safety for the occupants of the building, particularly if the elevators are inoperative. This spreading of the fire occurs because the stairwells comprise uninterrupted vertical shafts which create an upward draft enhanced by heated air which moves rapidly upward, spreading the fire. Flames and smoke in the stairwells prohibit their use for escape purposes and make it practically impossible for occupants of the building to pass the level where the fire originated.

While helical slides have been proposed for use as emergency escapes, as shown in prior patents such as U.S. Pat. Nos. 277,156, 826,613, 935,142 and 1,194,098, such shapes have apparently been considered too intricate and complex to be built in the conventional way and the labor costs prohibitively high to make them practical and economically feasible for use in modern high rise buildings.

SUMMARY OF THE INVENTION

The present invention provides a novel approach to the problem through the use of a plurality of prefabricated reinforced concrete modular units preferably made from light weight concrete which are used to form in an economically feasible manner an escape route for the rapid and safe evacuation of occupants of a high rise building. The prefabricated units are attached to each other and secured to and supported by a surrounding steel framework.

The escape structure formed by the assembled units provides two fire escape doors on each floor level, two separate helical slides, three smokestacks and a sprinkler system throughout the entire height of the building.

When the prefabricated units are placed side-by-side and stacked in pairs on top of each other, two separate helical slopes are automatically formed by the cooperation of complementary portions of the adjacent units. The helical slides are prefabricated in sections of 180° and formed in precast concrete as an integral part of each unit, being cantilevered from the surrounding circular shaft wall.

The structure of the present invention provides three built-in smokestacks. This is important because a large number of people fall victim to fires because of suffocation by smoke inhalation. Openings may be provided in the exterior wall at the corner somkestacks to permit their simultaneous use as shoe drops, since persons wearing shoes with heavy or pointed heels are a potential danger to others using the helical slopes.

Both of the independent helical slopes wind around a central circular smokestack which may be made of concrete or metal pipe sections joined vertically.

A sprinkler system inside the escape unit turns on automatically upon the opening of either exit door on each floor. Besides being a safety precaution, water from the sprinklers lubricates the helical slopes for people sliding down.

Two fire exit doors on each floor are provided at opposite sides of the unit, each leading to a separate entrance platform. Each entrance platform leads to a steeply sloping "on" ramp for accelerating the movement of those entering the escape slides.

The doors at the end of the slopes, at ground level, open automatically upon the opening of an exit door on any floor.

The invention provides two fire escape exit doors per unit on each floor instead of the customary one door to existing stairwells. The fire hazard may be close to or in front of the single door and the present invention provides the positive advantage of an alternative escape route.

Removing the occupants of the building through two doors and two separate escape slides permits also the evacuation to be performed much faster in seated position, thus effortless and safer than conventional stairwells, with no danger of trampling by people in panic as may occur in conventional stairwells, especially when it concerns very tall buildings and high occupancy loads.

Means may be provided for signalling users the proper time to enter the slopes in seated position by means of an electric eye and/or audible signals.

Modified units may be provided for use on the ground level, with the slope converting to straight sections, the ends of which may be slanted upwardly to brake the speed and halt those coming down the slopes.

DESCRIPTION OF THE DRAWINGS

FIG. 1 is an isometric view of the cross section on line 5—5 of FIG. 4 of an assembled escape structure to show the interior (one story high);

FIG. 2 is a perspective view of a prefabricated upper or A unit;

FIG. 3 is a perspective view of a prefabricated lower or B unit;

FIG. 4 is a sectional view of a lower unit B on the left and an upper unit A on the right, taken on line 4—4 of FIG. 5;

FIG. 5 is a sectional view of both units A and B taken on line 5—5 of FIG. 4;

FIG. 9 is an enlarged top plan view of one corner of the structure showing attachment of the supporting steel framework;

FIG. 10 is an enlarged vertical section showing welding of the angle irons of two adjacent units;

FIG. 11 is a sectional view taken on line 11—11 of FIGS. 5A and B;

FIG. 12 is a sectional view taken on line 12—12 of FIG. 4, and typical for all slope joints; and FIG. 13 is a partial horizontal section of a modified form of smokestack.

DESCRIPTION OF THE PREFERRED EMBODIMENT

Figure 6:
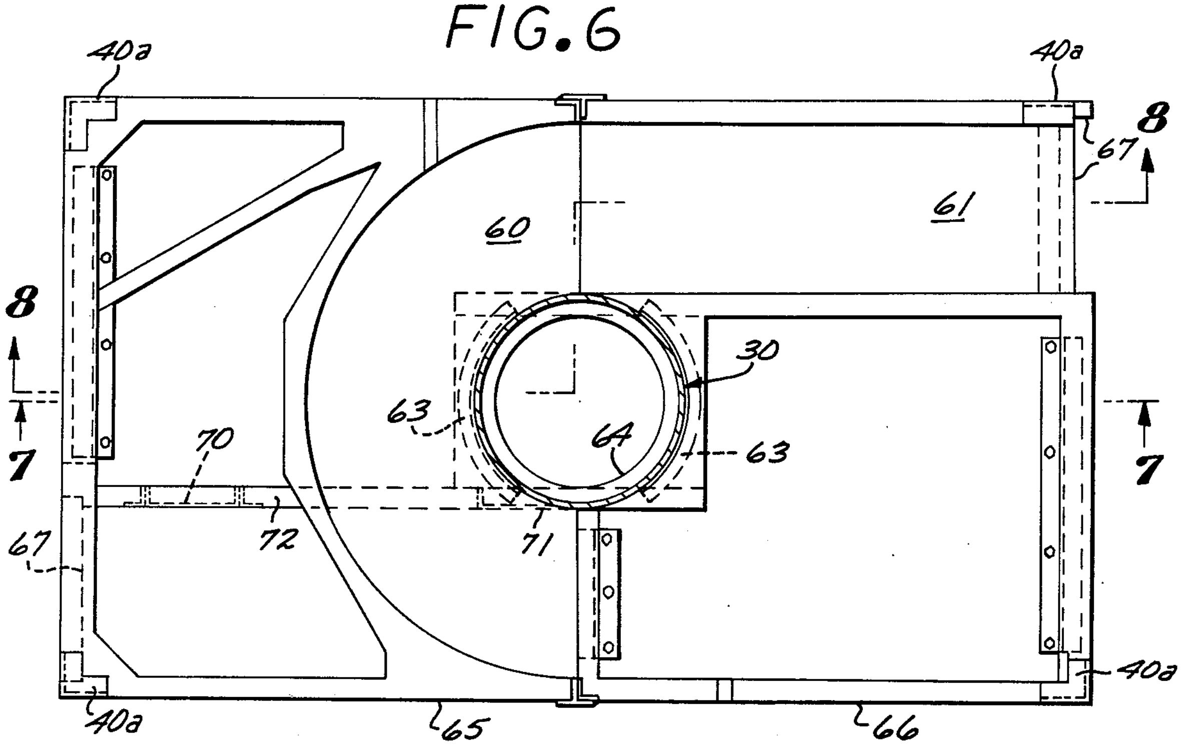
FIG. 6 is a sectional view taken on line 6—6 of FIG. 7 and FIG. 8 of modified lower units (B), such modified units being used just above the ground floor units, as shown in plan in FIG. 6.

A preferred embodiment which has been selected to illustrate the invention comprises a plurality of prefabricated modules or units which are preferably formed of fire resistant, light weight reinforced concrete. The units are joined together by combining steel members which are inserted and anchored into adjoining areas of the units when the units are formed.

The units comprise two separate types, upper and lower, which are referred to for convenience as type A and type B. Each floor of the building has two complemental, confronting identical upper A units stacked on top of two lower oppositely facing identical lower B units the four units constituting a set. It is also feasible for the total set to comprise one, two, three or more than four units per floor height. At the connection joints the configuration of units A and B is identical and they are therefore interchangeable with each other.

Each upper type A unit, which is shown in FIG. 2 of the drawings, has adjacent one corner thereof the lower half 10 of an opening which is provided in one side wall 11 thereof for an exit door plus frame (not shown). Adjacent thereto is a level horizontal entrance platform 12, the inner end of which leads to an entrance 13. Extending horizontally across the vertical portion of the entrance 13 is a handle or grab bar 14 which requires a user to assume a seated position before entering the adjacent acceleration ramp 15 which adjoins the platform 12 at the entrance 13.

The acceleration ramp 15 slopes sharply downwardly at a steeper angle than the helical upper ramp portion or slope 16 to which it is connected at its opposite end. The purpose of this is to provide an "on" ramp which accelerates the speed of persons entering to approximately equal that of those already on the helical slopes. The helical slope 16 is tapered and cantilevered inwardly from the adjacent vertical shaft walls 17 of the unit. A closed triangular smokestack 18 is provided in the corner of the unit A to act as a combined smokestack and shoe drop. In the interior wall of the triangular smokestack 18 is an opening 19 (FIGS. 4 and 5) to receive an exhaust fan to remove smoke that penetrates into the structure. In case the structure is pressurized the opening can be used for a blower and stack 18 becomes the supply air duct.

Each lower unit type B, which is shown in FIG. 3 of the drawings, has adjacent one corner thereof the upper half 20 of an opening for the upper part of the frame of an exit door (not shown) which is provided in one side wall 21 thereof. The unit B has in one corner thereof a triangular smokestack 22. In case the structure is pressurized the opening can be used for a blower and stack 22 becomes a supply air duct. Each unit B has a semicircular lower ramp portion of a helical slope 24 which is tapered and cantilevered inwardly from the shaft wall 25. The portion of the wall 25 disposed beneath its helical slope 24 is cut away at 26 to provide head room 26 (FIG. 5) above the other entrance 13 to the helical slope to another unit A therebeneath.

The inner edges of the helical slopes 16 and 24 of units A and B are semi-circular when viewed from above, defining a hollow core adapted to mount boundary means in the form of a central circular smokestack 30, which may be formed of a plurality of vertically extending sections attached together at their ends as shown in FIG. 5 of the drawings.

The smokestack 30 is provided with one or more openings 31 on each floor adjacent to which is a suction cap 31*a* to enhance the exhaustion of smoke upon upward movement of forced air through the smokestack 30 and away from the helical slides formed by the joined helical slopes 16 and 24. All of the helical slopes are preferably treated with enamel paint to provide a smooth surface. The adjacent vertical shaft walls and the exterior of the smokestack 30 are preferably painted in the same manner.

The suction caps 31*a* may be omitted, if desired, but whether or not caps 31*a* are used, there are fans disposed inside the smokestack 30 at spaced intervals along the total height to force the air flow. The smokestack 30 would then function as an air supply duct to pressurize the total escape structure, to prevent the penetration of smoke into the escape structure.

One lower corner of each unit A is provided with a downwardly directed projection 35 which supports the helical slope above it and which is adapted to fit within a downwardly directed recess 36 formed in one upper corner of the unit B therebeneath. Each unit B also has downwardly directed projection 37 which is adapted to fit within a recess 38 formed in an upper corner of the unit A therebeneath. The upper and lower units A and B are thereby interengaged with each other when arranged vertically.

Both of the units A and B are provided at their adjoining vertical edges with continuous structural angle irons 40 and tees 41 which are anchored with studs 42 in the concrete. Angle irons 40*b* (FIGS. 3, 5 and 10) is a continuous structural angle in the upper perimeter of unit B. All the angle irons 40 and 40*a* and 40*b* and tees 41 of the respective units are anchored in the concrete and are welded to each other as shown in FIGS. 10 and 11. They are also welded to U-shaped horizontal frame members 43 and to H-shaped vertical supporting frame members 44 as shown in FIGS. 1,4,5, and 9.

As shown in detail FIG. 9, the combined or superposed sets of units are located in a vertically oriented shaft generally defined by the channels 43 and the H-frames 44 to which the channels 44 are welded. The frames 44 comprise supporting columns in general, or columns of the building if the structure is incorporated in the building at the time it is originally built.

Instead of being welded the member may be bolted, riveted or otherwise suitably connected.

As shown in FIG. 12 of the drawings, the concrete joints where the slopes of the units abut are preferably filled with suitable sealant 47.

As shown in FIG. 4, the central smokestack 30 is provided with a water supply line 48 which is connected to an adjacent sprinkler head 49 and through a plurality of pipes 50 to additional sprinkler heads 49 at various levels adjacent both helical slopes. The sprinklers supply water to both slides. Control circuits may be provided for automatic operation of the sprinkler system on all floors upon opening of any fire exit door.

Each of the helical slopes 16 and 24 is provided with a pair of vertically directed welding plates 51 which are anchored in the concrete and which are fastened to the adjacent portions of the central circular smokestack 30 to support it.

The triangular smokestack formed by the sections 22 of units B are provided with a shoe drop opening 23 on each floor. The opening is preferably covered with a hinged flap door and enclosed with a smash glass protector on its exterior surface. The shoes drop into a space at the ground floor level where they may be retrieved through a suitable opening 70, which may comprise a manhole with metal closure plate, after the emergency period.

With reference to FIG. 13, in the event that the foregoing escape structure is to be pressurized, as previously mentioned in connection with the description of the triangular smokestacks, the central circular smokestack 30 and its associate openings 31 would be designed for use as an air duct to effect such pressurization. In addition, the triangular smokestacks 18 and 22 in the two corners of the unit would be fitted with access elevators to enable firemen and necessary equipment to be transported to any floor and to permit occupants on any floor to escape. Auxiliary doors 18*b* would be provided on all floor levels to afford firemen access to all floor levels from the elevator side of the doors 18*b*.

Figure 7:
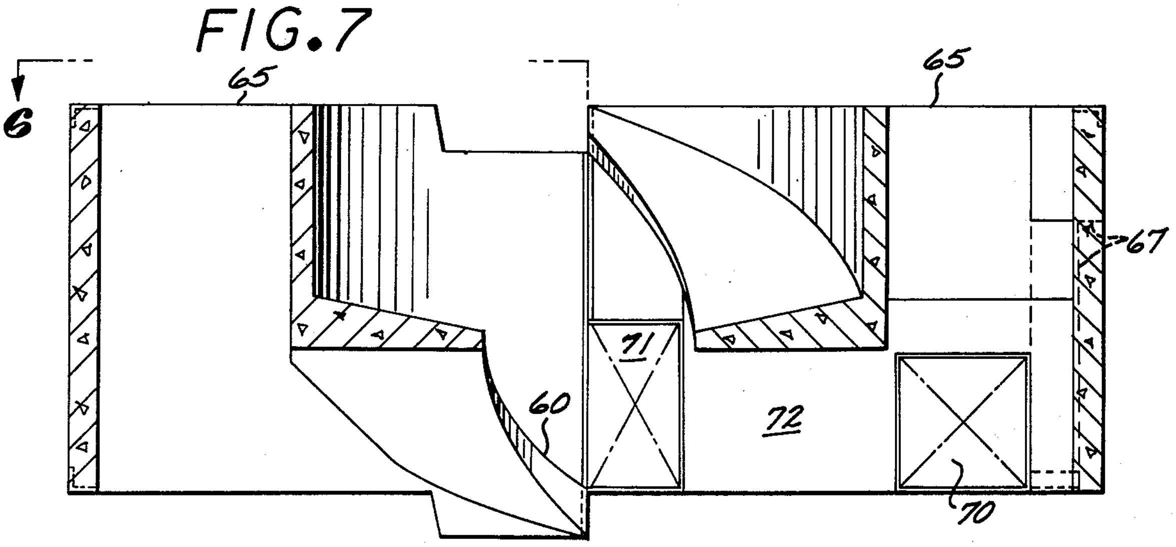
FIG. 7 is a sectional view of modified units (B) taken on line 7—7 of FIG. 6.
Figure 8:
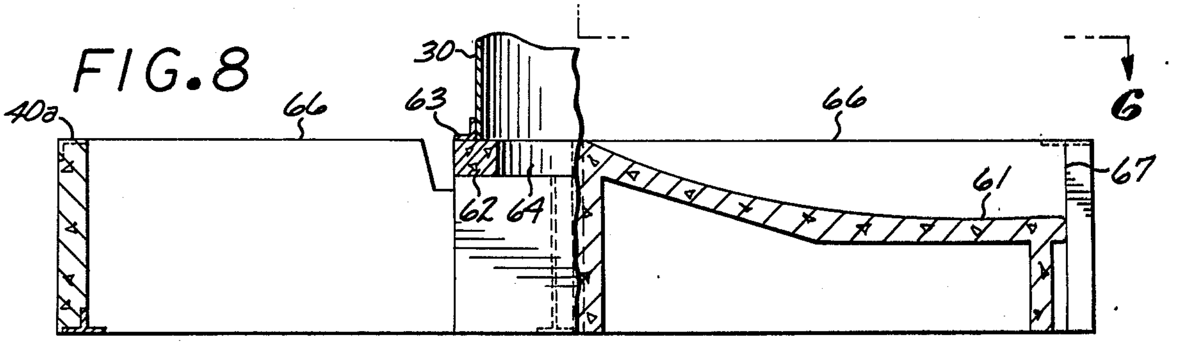
FIG. 8 is a sectional view of ground floor units taken on line 8—8 of FIG. 6.

FIGS. 6, 7 and 8 show modified untis which are used at ground level. They are essentially similar to the units B which are used on the floors above ground level. Each of the helical slides terminates in a transition slope 60 followed by a terminal section 61 which is straight and slopes slightly upwardly at the end to slow the descent to a halt prior to leaving the slope.

The ground unit is provided with a concrete plate 62 and support angle 63 for supporting the central smokestack 30. An opening 64 in the plate 62 may be provided at the bottom of the smokestack 30 for air intake and an exhaust blower. A metal closure plate 71 is disposed between a wall 72 and the smokestack 30. The bottom unit 66 and the modified unit B (65) directly above are provided with a recess 67 to fit a frame for the ground floor exit door. This door opens also automatically by opening exit door on any floor (this simultaneous with activating the sprinkler system).

Each entrance to the slope 13 may be controlled by an electric eye 68 and a buzzer signal system to signal the user the proper time for entering the helical slides.

It would be possible to make sectional precast escape units of the type shown and described without exterior walls, if desired.

Various modifications and changes may be made with regard to the foregoing detailed description without departing from the spirit of the invention.

I claim:

1. In a building having a multiple story framework generally defining a vertically oriented shaft extending downwardly past a plurality of floors of the building, a prefabricated escape structure comprising:

a plurality of substantially identical superposed sets of modules in said shaft, each of said sets including a pair of substantially identical upper modules of precast material arranged in complemental, confronting relation, and including ramp portions defining upper sections of separate first and second helical slides providing a pair of separated escape paths; each of said sets further including a pair of substantially identical lower modules of precast material arranged in complemental, confronting relation, and including ramp portions defining lower sections of said first and second slides, said lower modules being arranged below said upper modules with said ramp portions of said lower modules forming downwardly extending continuations of said ramp portions of said upper modules whereby said first and second helical slides formed by said sets of modules are continuous, all of said ramp portions being of cantilever construction, the inner, cantilevered sections of said ramp portions terminating to define a hollow core extending downwardly through said sets of modules;

boundary means attached to and supported by said cantilevered sections of said ramp portions to define a barrier between said first and second helical slides and said hollow core; and mounting means securing said modules of each of said sets to said framework of said building whereby said framework supports said sets.

2. A prefabricated escape structure according to claim 1 wherein said boundary means comprises a vertically extending smokestack for venting smoke from said first and second helical slides.

3. A prefabricated escape structure according to claim 1 wherein said mounting means include steel elements integral with each of said modules and located in adjacent relation whereby said modules of each of said sets are securable to one another.

4. A prefabricated escape structure according to claim 1 wherein each of said modules includes an area open at its top and bottom and thereby communicating with a corresponding said area of the superjacent and subjacent ones of said modules to define a supplementary smokestack extending vertically through said sets of modules.

5. A prefabricated escape structure according to claim 1 and including sprinkler heads operative to spray water onto said first and second helical slides.

6. A prefabricated escape structure according to claim 1 wherein each of said sets of modules includes a pair of acceleration ramps in communication with said first and second helical slides, respectively, and further includes a pair of separate entrances providing communication from each of said floors to said pair of acceleration ramps, respectively, each of said acceleration ramps being more steeply sloped than said ramp portions for accelerating downward slidable movement of persons entering said first and second helical slides.

7. A prefabricated escape structure according to claim 6 and including horizontally oriented handle bar adjacent each of said acceleration ramps, said bar being disposed at a height tending to prevent passage except by persons in a seated position.

* * * * *

UNITED STATES PATENT OFFICE

CERTIFICATE OF CORRECTION

Patent No. 4,035,970 Dated July 19, 1977

Inventor(s) WILLY H. WELCKER

It is certified that error appears in the above-identified patent and that said Letters Patent are hereby corrected as shown below:

Column 1, line 62, cancel "somkestacks" and insert -- smokestacks --.

Column 3, line 15, cancel "oppositely facing" and insert -- complemental, confronting --;
and line 61, cancel "to" and insert -- of --.

Column 5,
and line 34, cancel "this" and insert -- thus --.

Signed and Sealed this

*First* Day of *November 1977*

[SEAL]

*Attest:*

RUTH C. MASON
*Attesting Officer*

LUTRELLE F. PARKER
*Acting Commissioner of Patents and Trademarks*